Figure 1:
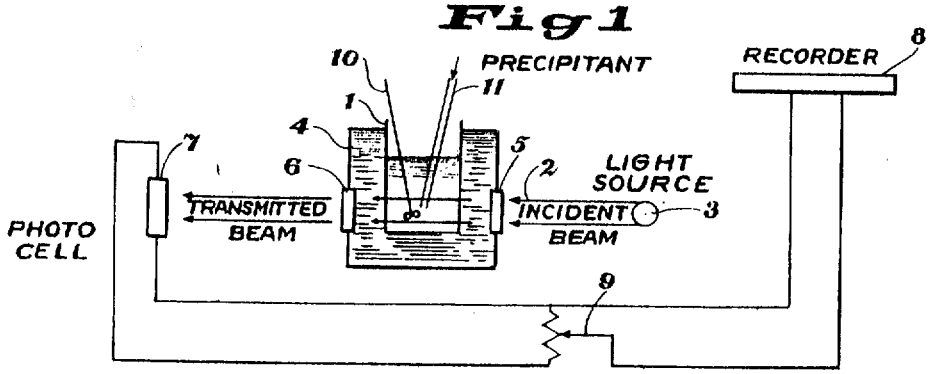
Figure 2:
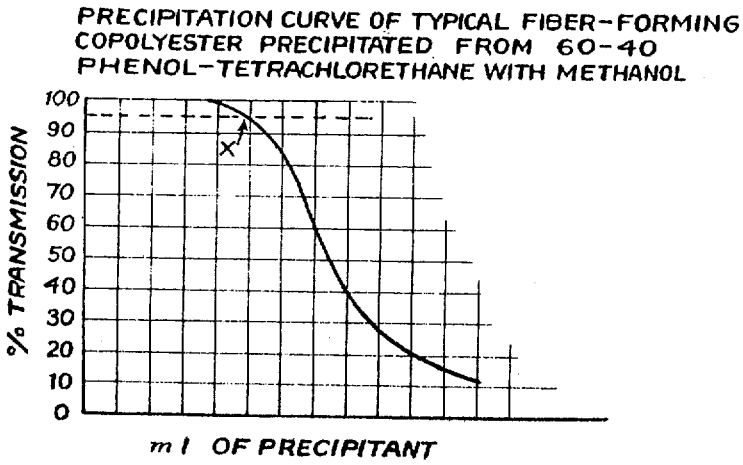

TP62016

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 27, 1969

862 O.G. 1009

776,311

METHOD OF PREVENTING REARRANGEMENT OF BLOCKED COPOLYESTERS

James G. Smith, Charles J. Kibler, and Roger M. Schulken, Jr., all of P.O. Box 511, Kingsport, Tenn. 37662

Continuation of application Ser. No. 678,457, Oct. 26, 1967. This application Nov. 13, 1968. Published May 27, 1969

Int. Cl. C08g *17/06, 51/56*

U.S. Cl. 260—75

5 Sheets Drawing. 36 Pages Specification

Block copolyesters prepared from (A) at least one glycol and (B) at least one dibasic acid comprising at least 60 mole percent of an acid having two carboxyl radicals attached to a carbocyclic nucleus having from 6–20 carbons per ring, in which copolyesters at least three components are present, one of which can be present as an isomer of one of the other two components, said copolyester if one of the fiber- and film-forming type, having a number average molecular weight between about 8,000 to about 100,000, are treated in the powdered form with steam at a high temperature from the range of from about 100° C. to about 200° C. for a period ranging from ¼ hour to 20 hours whereby the block-type structure is stabilized. In the alternative such block copolyesters are treated with from about 0.005 to 0.5% by weight of an arsenic compound, e.g. arsenic pentoxide. Either alternative method results in a block copolyester having a stabilized form which resists randomization probably because the catalyst has been converted into an inactive form.

T 862,016

SN - 776311

May 27, 1969 J. G. SMITH ET AL DEF. PUB.

METHOD OF PREVENTING REARRANGEMENT OF BLOCKED COPOLYESTERS

Filed Nov. 13, 1968 Sheet 1 of 5

James G. Smith
Charles J. Kibler
Roger M. Schulken, Jr.
INVENTORS

BY R. Frank Smith
Charles L. Good
ATTORNEYS

T 862,016

SN - 776311

May 27, 1969 J. G. SMITH ET AL DEF. PUB.

METHOD OF PREVENTING REARRANGEMENT OF BLOCKED COPOLYESTERS

Filed Nov. 13, 1968 Sheet 2 of 5

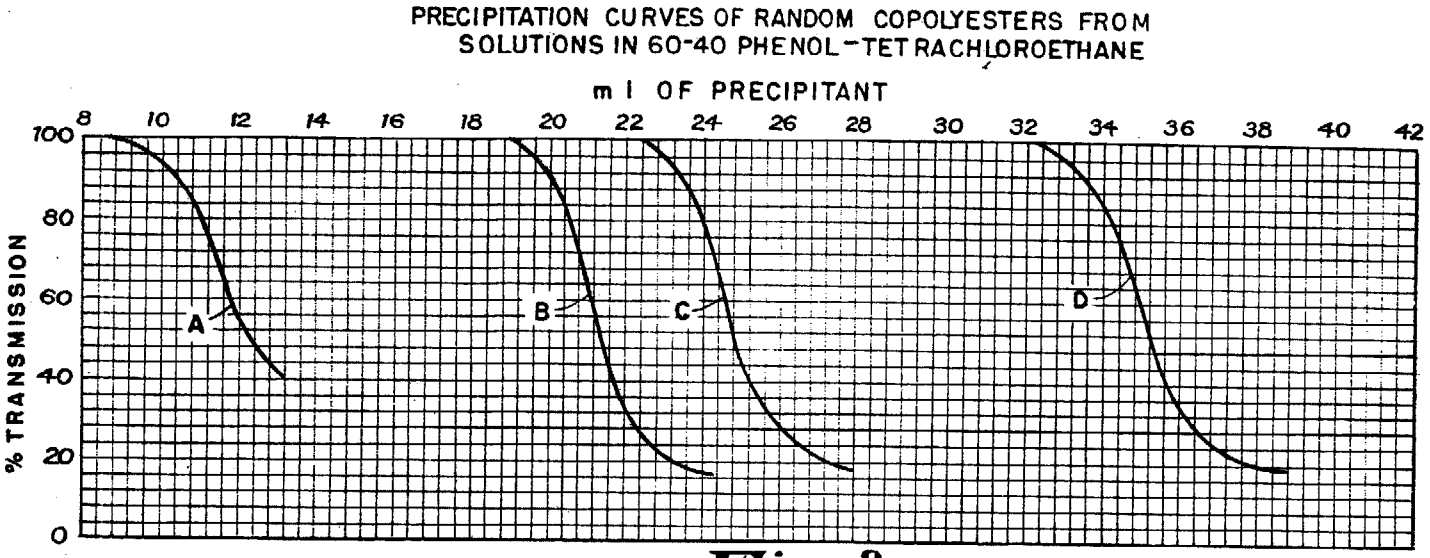

Fig. 3

COPOLYESTERS FROM 1,4 CYCLOHEXANEDIMETHANOL (CHDM)

| CURVE | POLYESTER | MOLE PERCENT OF MODIFYING ACID BASED ON TOTAL ACID | |
|---|---|---|---|
| A | CHDM—TEREPHTHALIC ACID | | 0 |
| B | " " | SUCCINIC ACID | 25 |
| C | " " | SEBACIC ACID | 25 |
| D | " " | SUCCINIC ACID | 40 |

James G. Smith
Charles J. Kibler
Roger M. Schulken, Jr.
INVENTORS

BY R. Frank Smith
Charles L. Good
ATTORNEYS

T 862,016

SN - 776311

May 27, 1969 J. G. SMITH ET AL DEF. PUB.

METHOD OF PREVENTING REARRANGEMENT OF BLOCKED COPOLYESTERS

Filed Nov. 13, 1968 Sheet 3 of 5

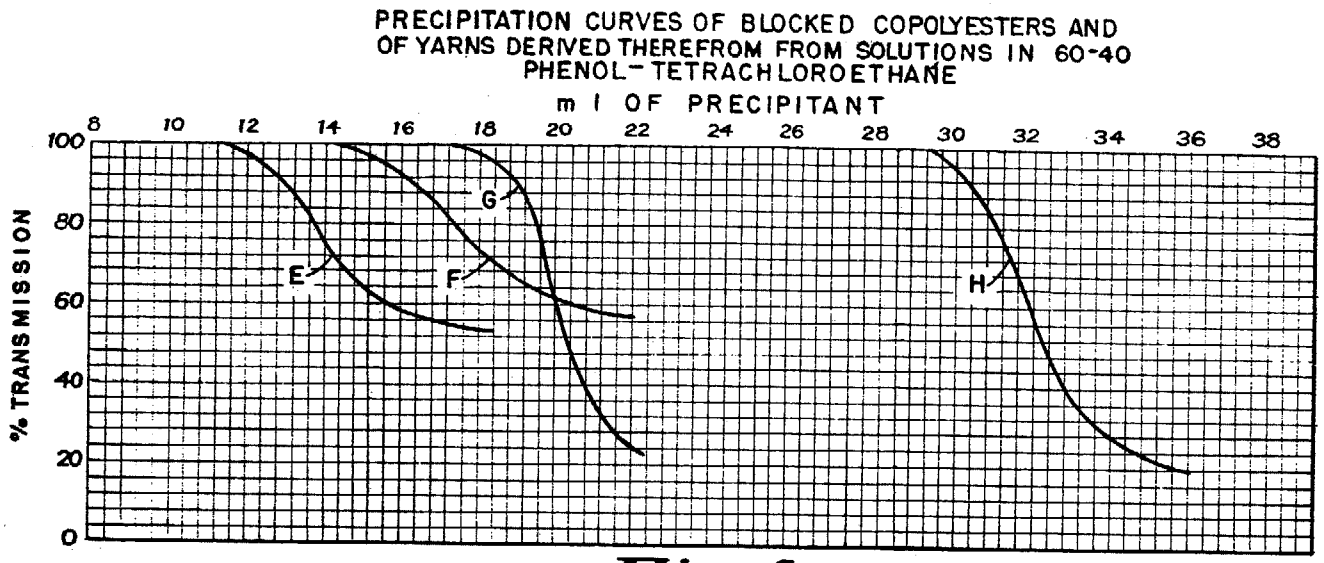

Fig. 4

COPOLYESTERS FROM 1,4 CYCLOHEXANEDIMETHANOL (CHDM)

| CURVE | POLYESTER | MOLE PERCENT OF MODIFYING ACID BASED ON TOTAL ACID | |
|---|---|---|---|
| E | CHDM—TEREPHTHALIC ACID | SUCCINIC ACID | 25 |
| F | " " | " " | 40 |
| G | " " | " " | 25 |
| H | " " | " " | 40 |

James G. Smith
Charles J. Kibler
Roger M. Schulken, Jr.
INVENTORS

BY R. Frank Smith
Charles L. Good
ATTORNEYS

T 862,016

SN - 776311

DEF. PUB.

May 27, 1969 J. G. SMITH ET AL

METHOD OF PREVENTING REARRANGEMENT OF BLOCKED COPOLYESTERS

Filed Nov. 13, 1968

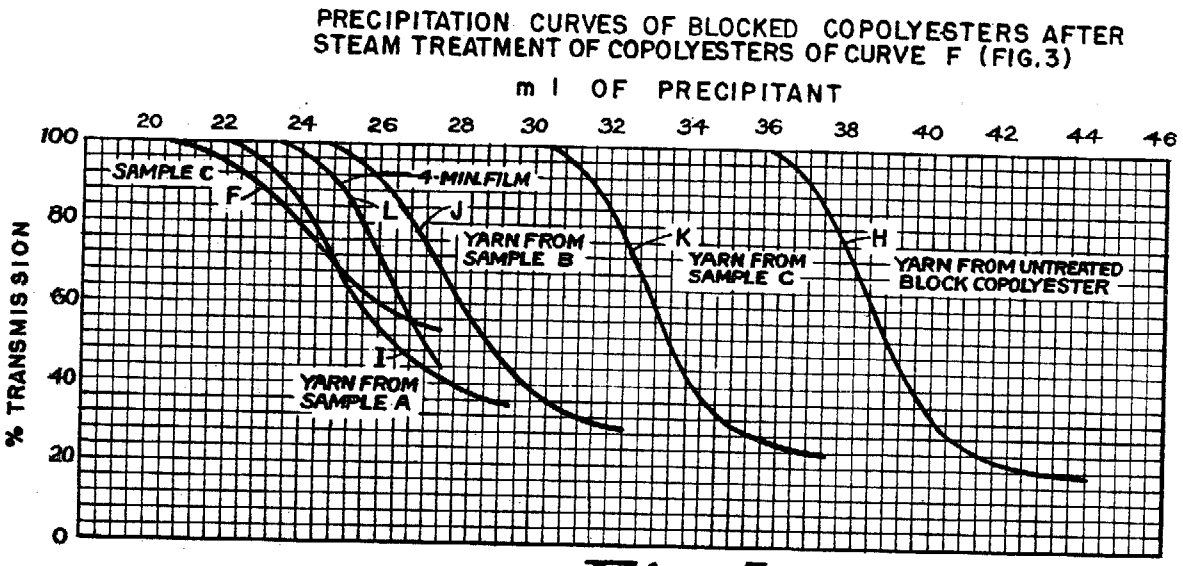

Fig. 5

COPOLYESTERS FROM 1,4 CYCLOHEXANEDIMETHANOL (CHDM)

| CURVE | POLYESTER | MOLE PERCENT OF MODIFYING ACID BASED ON TOTAL ACID |
|---|---|---|
| F | CHDM-TEREPHTHALIC ACID | SUCCINIC ACID 40 |
| I | " " " | " " 40 |
| J | " " " | " " 40 |
| K | " " " | " " 40 |
| L | " " " | " " 40 |
| H | " " " | " " 40 |

James G. Smith
Charles J. Kibler
Roger M. Schulken, Jr.
INVENTORS

BY R. Frank Lynch
Charles L. Good
ATTORNEYS

T 862,016

SN - 776311

May 27, 1969 J. G. SMITH ET AL DEF. PUB.

METHOD OF PREVENTING REARRANGEMENT OF BLOCKED COPOLYESTERS

Filed Nov. 13, 1968 Sheet 5 of 5

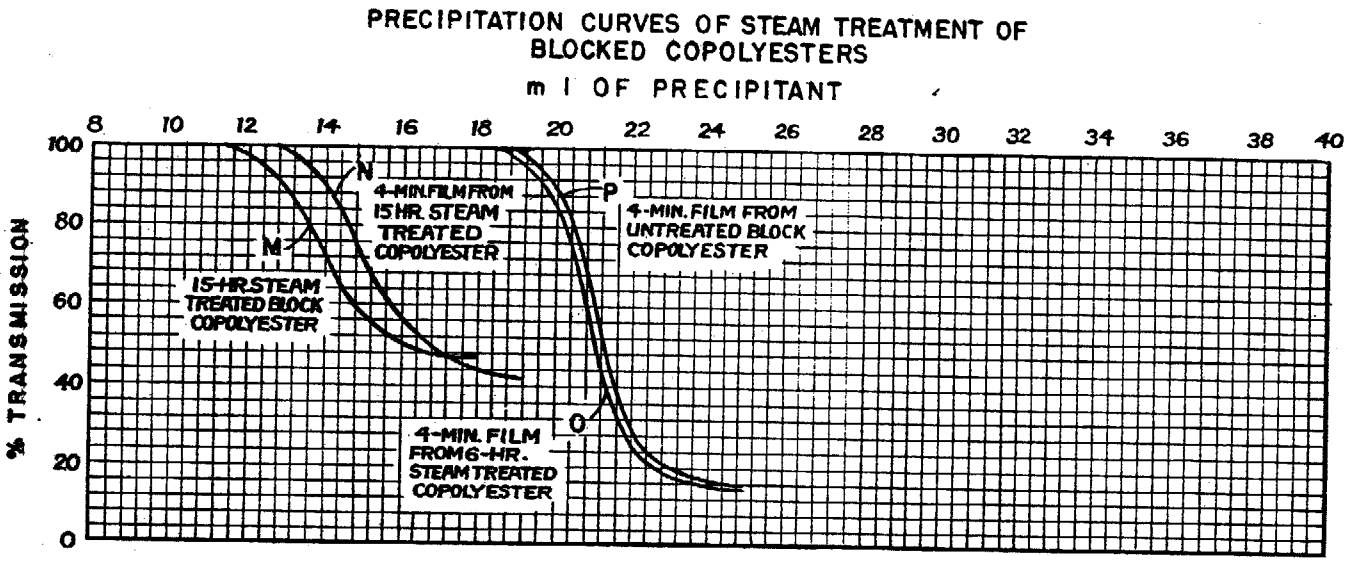

Fig. 6

COPOLYESTERS FROM 1,4 CYCLOHEXANEDIMETHANOL (CHDM)

| CURVE | POLYESTER | MOLE PERCENT OF MODIFYING ACID BASED ON TOTAL ACID |
|---|---|---|
| M | CHDM-TEREPHTHALIC ACID | SUCCINIC ACID 25 |
| N | " " " | " " 25 |
| O | " " " | " " 25 |
| P | " " " | " " 25 |

James G. Smith
Charles J. Kibler
Roger M. Schulken, Jr.
INVENTORS

BY R. Frank Smith
Charles L. Good
ATTORNEYS